US012802082B2

(12) United States Patent
Alagarsamy et al.

(10) Patent No.: US 12,802,082 B2
(45) Date of Patent: Nov. 17, 2026

(54) TECHNOLOGIES RELATING TO ENHANCED CHATBOT INTERACTIONS WITH WEBPAGE BROWSING CUSTOMERS

(71) Applicant: GENESYS CLOUD SERVICES, INC., Menlo Park, CA (US)

(72) Inventors: Mukunthan Alagarsamy, Chennai (IN); Abitha Vijayakumaar, Chennai (IN); Navin Balasubramani, Chennai (IN); Prasanna Venkatesan Krishnaswamy, Chennai (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 182 days.

(21) Appl. No.: 18/814,410

(22) Filed: Aug. 23, 2024

(65) Prior Publication Data

US 2026/0057394 A1 Feb. 26, 2026

(51) Int. Cl.

*G06Q 30/00* (2023.01)
*G06F 3/04842* (2022.01)
*G06F 16/9535* (2019.01)
*G06Q 30/015* (2023.01)

(52) U.S. Cl.

CPC ....... *G06Q 30/015* (2023.01); *G06F 3/04842* (2013.01); *G06F 16/9535* (2019.01)

(58) Field of Classification Search

CPC .................................................... G06Q 30/015
See application file for complete search history.

(56) References Cited

U.S. PATENT DOCUMENTS

2024/0160656 A1* 5/2024 Lehmann .................. G06F 3/14

OTHER PUBLICATIONS

Pergantis, Pantelis, et al. "AI chatbots and cognitive control: enhancing executive functions through chatbot interactions: a systematic review." Brain Sciences 15.1 (2025): 47.*

* cited by examiner

*Primary Examiner* — Kathleen Palavecino
(74) *Attorney, Agent, or Firm* — Taft Stettinius & Hollister LLP

(57) ABSTRACT

A process for generating a query in response to a customer indicating a point of interest on a webpage. The query generation process includes: queuing, in a web content message queue, web content messages of web content used to render the webpage and storing in a datastore as stored web content messages; receiving input from the customer via a point of interest indicator selecting a visual element on the webpage as the point of interest; determining a web element associated with the visual element for transmitting to a point of interest backend service; initiating a search of the stored web content messages using the web element to determine matching data; gathering associated data related to the matching data for indicating a context of the first query; and providing the associated data to the chatbot feature for generating the first query.

20 Claims, 7 Drawing Sheets

TECHNOLOGIES RELATING TO ENHANCED CHATBOT INTERACTIONS WITH WEBPAGE BROWSING CUSTOMERS

BACKGROUND

The present invention generally relates to customer relations services and customer relations management via contact centers and associated cloud-based systems. More particularly, but not by way of limitation, the present invention pertains to systems and methods for enhancing chatbot interactions related to browsing customers via element selection. As will be seen, existing problems associated with properly engaging browsing customers are addressed via an integration of a chatbot feature that has a point of interest query generator, which maintains customer engagement by initiating queries on the customer's behalf based on a customer-selected point of interest.

BRIEF DESCRIPTION OF THE INVENTION

The present invention includes a computer-implemented method for facilitating generating a query for a customer based on a point of interest identified on a webpage by the customer. The method may include generating, as part of a webpage being displayed on a user device of a customer, a chatbot feature. The chatbot feature may include a point of interest indicator that has a pointing tool for indicating a point of interest on a webpage. The pointing tool may be an engageable icon that, once engaged, is operably movable by the customer for selecting a visual element on the webpage as the point of interest. The method may further include providing a point of interest backend service communicationally linked via a network to both the chatbot feature and a database comprising a web content message queue. The method may include executing a query generation process to generate a first query in response to the customer indicating a first point of interest on a first webpage. The query generation process may include: queuing, in the web content message queue, web content messages of web content used to render the first webpage on the user device of the customer; receiving the queued web content messages from the web content message queue for storing as stored web content messages in the datastore; receiving a first input from the customer via the point of interest indicator selecting a first visual element on the first webpage as the first point of interest; determining a first web element associated with the first visual element and transmitting the first web element to the point of interest backend service; initiating, in response to receiving the first web element at the point of interest backend service, a search of the stored web content messages using the first web element to determine if matching data is contained therewithin; upon finding the matching data via the search of the stored web content messages, gathering associated data indicative of a context related to the first query, the associated data comprising data determined to be stored in association with the matching data in the stored web content messages; and providing the associated data to the chatbot feature for generating the first query.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
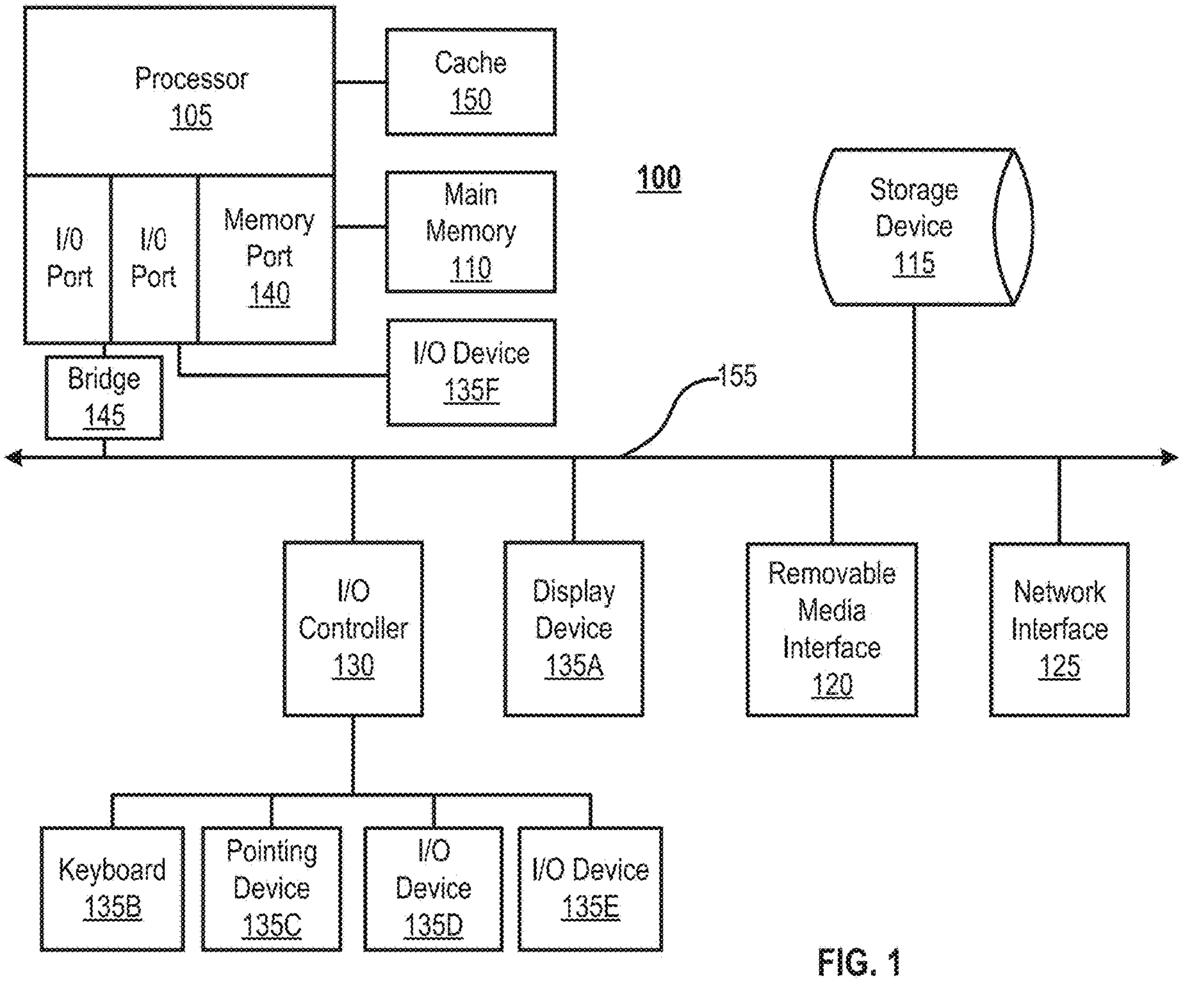
FIG. 1 depicts a schematic block diagram of a computing device in accordance with exemplary embodiments of the present invention and/or with which exemplary embodiments of the present invention may be enabled or practiced.

For the purpose of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art. Particular features, structures or characteristics may be combined in any suitable combinations and/or sub-combinations in one or more embodiments or examples. Those skilled in the art will recognize that various embodiments may be computer implemented using many different types of data processing equipment, with embodiments being implemented as an apparatus, method, or computer program product. Example embodiments, thus, may take the form of a hardware embodiment, a software embodiment, or combination thereof.

Computing Device

The present invention may be computer implemented using different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced.

The computing device 100, for example, may be implemented via firmware (e.g., an application-specific integrated circuit), hardware, or a combination of software, firmware, and hardware. Each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the processor 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. More generally, the I/O devices 135 may include any conventional devices for performing the functionality described herein.

Unless otherwise limited, the computing device 100 may be any workstation, desktop computer, laptop or notebook computer, server machine, virtualized machine, mobile or smart phone, portable telecommunication device, media playing device, or any other type of computing, telecommunications or media device, without limitation, capable of performing the operations and functionality described herein. The computing device 100 may include a plurality of such devices connected by a network or connected to other systems and resources via a network. Unless otherwise limited, the computing device 100 may communicate with other computing devices 100 via any type of network using any conventional communication protocol.

Contact Center

Figure 2:
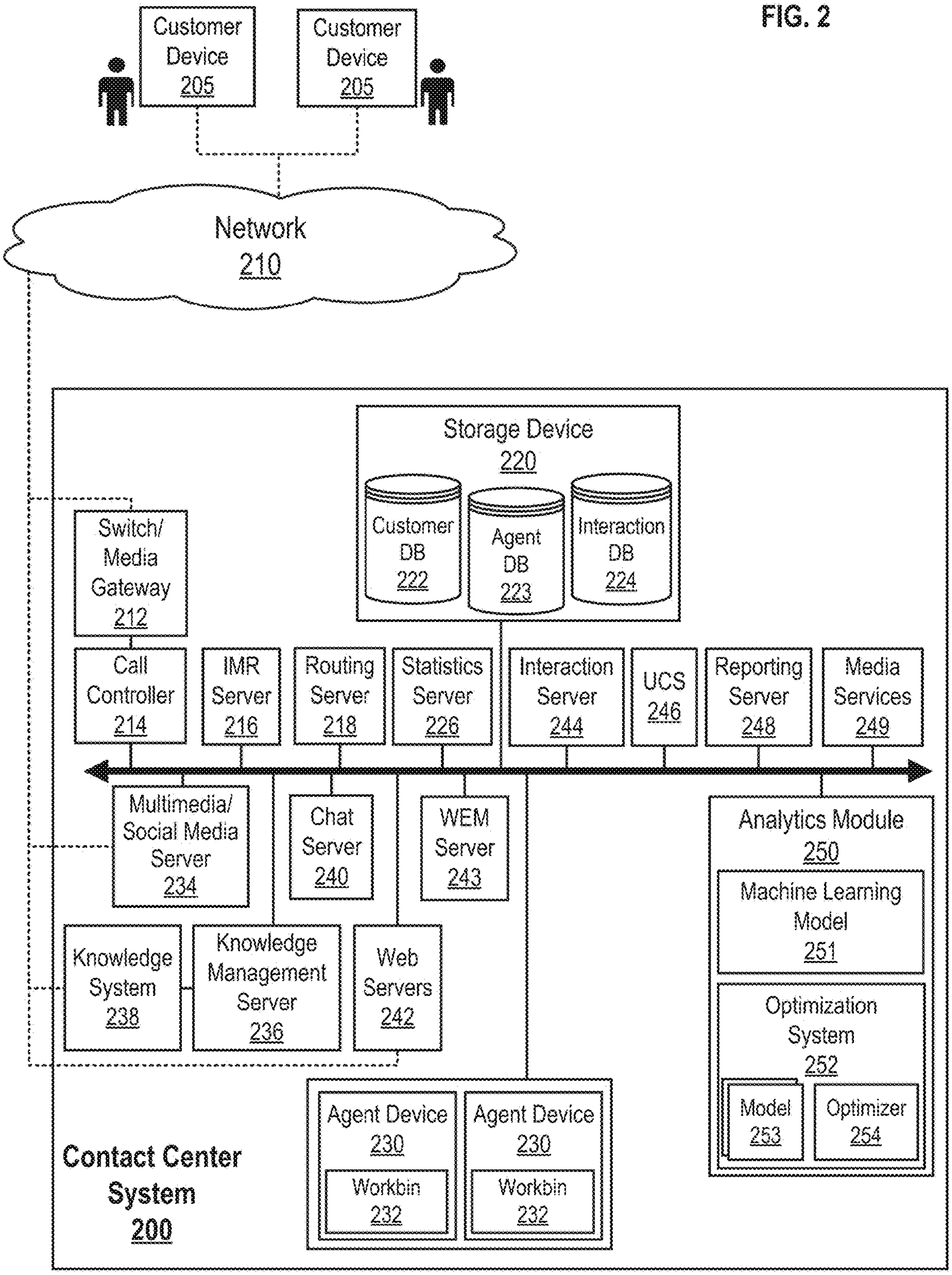
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system (or simply "contact center") 200 is shown in accordance with exemplary embodiments of the present invention and/or with which exemplary embodiments of the present invention may be enabled or practiced. By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between agents and customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize automated processes in place of live agents, such as interactive voice response (IVR) systems, interactive media response (IMR) systems, internet robots or "bots", automated chat modules or "chatbots", and the like.

Referring specifically to FIG. 2, the contact center 200 may be used by a customer service provider to provide various types of services to customers. For example, the contact center 200 may be used to engage and manage interactions in which automated processes (or bots) or human agents communicate with customers. The contact center 200 may be an in-house facility of a business or enterprise for performing the functions of sales and customer service relative to products and services available through the enterprise. In another aspect, the contact center 200 may be operated by a service provider that contracts to provide customer relation services to a business or organization. Further, the contact center 200 may be deployed on equipment dedicated to the enterprise or third-party service provider, and/or deployed in a remote computing environment such as, for example, a private or public cloud environment with infrastructure for supporting multiple contact centers for multiple enterprises. The contact center 200 may include software applications or programs, which may be executed on premises or remotely or some combination thereof. It should further be appreciated that the various components of the contact center 200 may be distributed across various geographic locations.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center 200 may include: a plurality of customer devices 205; communications network (or simply "network") 210; switch/media gateway 212; call controller 214; interactive media response (IMR) server 216; routing server 218; storage device 220; statistics server 226; plurality of agent devices 230 that each have a workbin 232; multimedia/social media server 234; knowledge management server 236 coupled to a knowledge system 238; chat server 240; webservers 242; interaction server 244; universal contact server (or "UCS") 246; reporting server 248; media services server 249; and an analytics module 250. It should be understood that any of the computer-implemented components, modules, or servers described in relation to FIG. 2 or in any of the following figures may be implemented via computing devices, such as the computing device 100 of FIG. 1. As will be seen, the contact center 200 generally manages resources (e.g., personnel, computers, telecommunication equipment, etc.) to enable the delivery of services via telephone, email, chat, or other communication mechanisms. The various components, modules, and/or servers of FIG. 2 (and other figures included herein) each may include one or more processors executing computer program instructions and interacting with other system components for performing the various functionalities described herein. Further, the terms "interaction" and "communication" are used interchangeably, and generally refer to any real-time and non-real-time interaction that uses any communication channel including, without limitation, telephone calls (PSTN or VoIP calls), emails, voicemails, video, chat, screen-sharing, text messages, social media messages, WebRTC calls, etc. Access to and control of the components of the contact system 200 may be affected through user interfaces (UIs) which may be generated on the customer devices 205 and/or the agent devices 230.

Customers desiring to receive services from the contact center 200 may initiate inbound communications (e.g., telephone calls, emails, chats, etc.) to the contact center 200 via a customer device 205. While FIG. 2 shows two such customer devices it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center 200, such as telephone calls, emails, chats, text messages, web-browsing sessions, and other multi-media transactions. Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access network, global system for mobile communications (GSM) network, or any wireless network/technology conventional in the art.

The switch/media gateway 212 may be coupled to the network 210 for receiving and transmitting telephone calls between customers and the contact center 200. The switch/media gateway 212 may include a telephone or communication switch configured to function as a central switch for agent routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. In general, the switch/media gateway 212 establishes a voice connection between the customer and the agent by establishing a connection between the customer device 205 and agent device 230. The switch/media gateway 212 may be coupled to the call controller 214 which, for example, serves as an adapter or interface between the switch and the other routing, monitoring, and communication-handling components of the contact center 200. The call controller 214 may be configured to process PSTN calls, VoIP calls, etc. The call controller 214 may include computer-telephone integration (CTI) software for interfacing with the switch/media gateway and other components. The call controller 214 may extract data about an incoming interaction, such as the customer's telephone number, IP address, or email address, and then communicate these with other contact center components in processing the interaction.

The interactive media response (IMR) server 216 enables self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. Through continued interaction with the IMR server 216, customers may receive service without needing to speak with an agent. The IMR server 216 may ascertain why a customer is contacting the contact center so to route the communication to the appropriate resource.

The routing server 218 routes incoming interactions. For example, once it is determined that an inbound communication should be handled by a human agent, functionality within the routing server 218 may select the most appropriate agent and route the communication thereto. This type of functionality may be referred to as predictive routing. Such agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230, which may enhance the service the agent is able to provide.

Regarding data storage, the contact center 200 may include one or more mass storage devices—represented generally by the storage device 220—for storing data in one or more databases. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center 200 may include agent availability and agent profiles, schedules, skills, average handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center 200 in ways that facilitate the functionality described herein. For example, the servers or modules of the contact center 200 may query such databases to retrieve data stored therewithin or transmit data thereto for storage.

The statistics server 226 may be configured to record and aggregate data relating to the performance and operational aspects of the contact center 200. Such information may be compiled by the statistics server 226 and made available to other servers and modules, such as the reporting server 248, which then may produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center 200 to facilitate the functionality described herein. An agent device 230, for example, may include a telephone adapted for regular telephone calls or VoIP calls. An agent device 230 may further include a computing device configured to communicate with the servers of the contact center 200, perform data processing associated with operations, and interface with customers via voice, chat, email, and other multimedia communication mechanisms according to functionality described herein. While only two such agent devices are shown, any number may be present.

The multimedia/social media server 234 may be configured to facilitate media interactions (other than voice) with the customer devices 205 and/or the servers 242. Such media interactions may be related, for example, to email, voicemail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 234 may be configured to facilitate interactions between customers and the knowledge system 238. In general, the knowledge system 238 may be a computer system capable of receiving questions or queries and providing answers in response. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

The chat server 240 may be configured to conduct, orchestrate, and manage electronic chat communications with customers. Such chat communications may be conducted by the chat server 240 in such a way that a customer communicates with automated chatbots, human agents, or both. The chat server 240 may perform as a chat orchestration server that dispatches chat conversations among chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature. The chat server 240 may be configured to transfer chats within a single chat session with a particular customer between automated and human sources. The chat server 240 may be coupled to the knowledge management server 234 and the knowledge systems 238 for receiving suggestions and answers to queries posed by customers during a chat so that, for example, links to relevant articles can be provided.

The webservers 242 provide site hosts for a variety of social interaction sites to which customers subscribe, such as Facebook, Twitter, Instagram, etc. Though depicted as part of the contact center 200, it should be understood that the webservers 242 may be provided by third parties and/or maintained remotely. The webservers 242 may also provide webpages for the enterprise or organization being supported by the contact center 200. For example, customers may browse the webpages and receive information about the products and services of a particular enterprise. Within such enterprise webpages, mechanisms may be provided for initiating an interaction with the contact center 200, for example, via web chat, voice, or email. An example of such a mechanism is a widget, which can be deployed on the webpages or websites hosted on the webservers 242. As used herein, a widget refers to a user interface component that performs a particular function. In some implementations, a widget includes a GUI that is overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Such widgets may include additional user interfaces and be configured to access a variety of local resources (e.g., a calendar or contact information on the customer device) or remote resources via network (e.g., instant messaging, electronic mail, or social networking updates).

The interaction server 244 is configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

The universal contact server (UCS) 246 may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer, such as data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to a request and used toward managing the contact center in accordance with functionality described herein.

The media services server 249 provides audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, audio and video transcoding, secure real-time transport protocol (SRTP), audio or video conferencing, call analysis, keyword spotting, etc.

The analytics module 250 may be configured to perform analytics on data received from a plurality of different data sources as functionality described herein may require. The analytics module 250 may also generate, update, train, and modify predictors or models, such as machine learning model 251 and/or models 253, based on collected data. To achieve this, the analytics module 250 may have access to the data stored in the storage device 220, including the customer database 222 and agent database 223. The analytics module 250 also may have access to the interaction database 224, which stores data related to interactions and interaction content (e.g., audio and transcripts of the interactions and events detected therein), interaction metadata (e.g., customer identifier, agent identifier, medium of interaction, length of interaction, interaction start and end time, department, tagged categories), and the application setting (e.g., the interaction path through the contact center). The analytic module 250 may retrieve such data from the storage device 220 for developing and training algorithms and models. It should be understood that, while the analytics module 250 is depicted as being part of a contact center, the functionality described in relation thereto may also be implemented on customer systems (or, as also used herein, on the "customer-side" of the interaction) and used for the benefit of customers.

The machine learning model 251 may include one or more artificial intelligence-based models, including machine learning models, such as neural networks, deep learning models as well as other types as described herein. As an example, the machine learning model 251 may be configured to predict behavior. Such behavioral models may be trained to predict the behavior of customers and agents in a variety of situations so that interactions may be personally tailored to customers and handled more efficiently by agents. As another example, the machine learning model 251 may be configured to predict aspects related to contact center operation and performance. In other cases, for example, the machine learning model 251 also may be configured to perform natural language processing and, for example, provide intent recognition and the like.

The analytics module 250 may further include an optimization system 252. The optimization system 252 may include one or more models 253, which may include the machine learning model 251, and an optimizer 254. The optimizer 254 may be used in conjunction with the models 253 to minimize a cost function subject to a set of constraints, where the cost function is a mathematical representation of desired objectives or system operation. Because the models 253 are typically non-linear, the optimizer 254 may be a nonlinear programming optimizer. It is contemplated, however, that the optimizer 254 may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like. The analytics module 250 may utilize the optimization system 252 as part of an optimization process by which aspects of contact center performance and operation are optimized or, at least, enhanced. This, for example, may include aspects related to the customer experience, agent experience, interaction routing, natural language processing, intent recognition, allocation of system resources, system analytics, or other functionality related to automated processes.

Chat Systems

Figure 3:
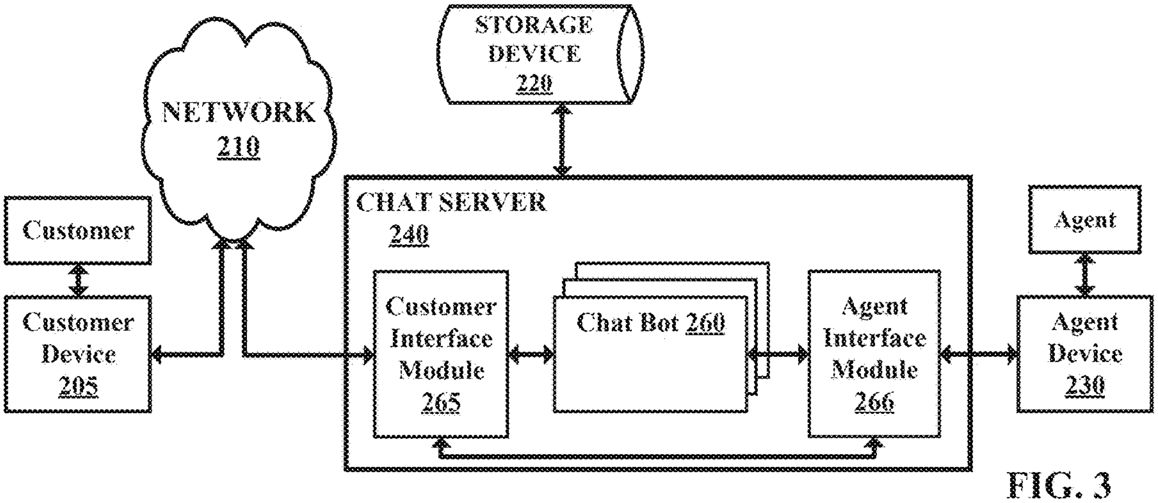
FIG. 3 is schematic block diagram showing further details of a chat server operating as part of the chat system according to embodiments of the present invention.
Figure 4:
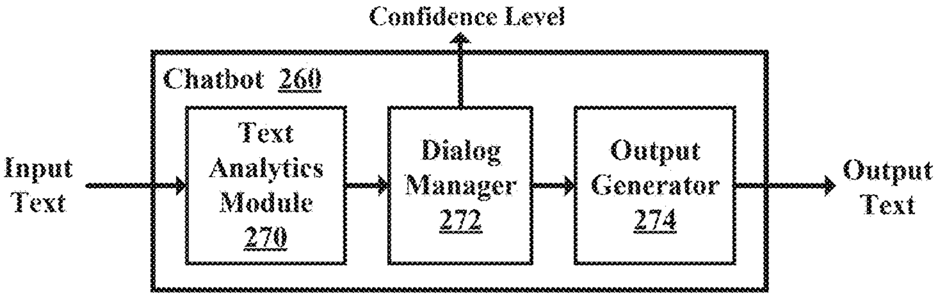
FIG. 4 is a schematic block diagram of a chat module according to embodiments of the present invention.
Figure 5:
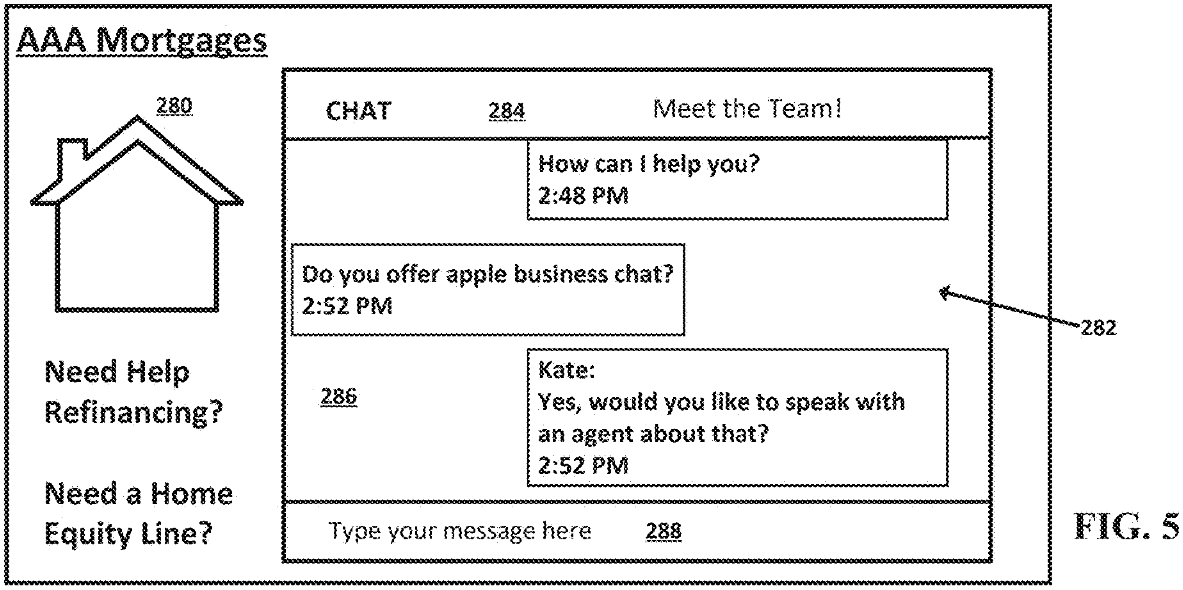
FIG. 5 is an exemplary customer chat interface according to embodiments of the present invention.

Turning to FIGS. 3, 4 and 5, various aspects of chat systems and chatbots are shown. As will be seen, present embodiments may include or be enabled by such chat features, which, in general, enable the exchange of text messages between different parties. Those parties may include live people, such as customers and agents, as well as automated processes, such as bots or chatbots.

By way of background, a bot (also known as an "Internet bot") is a software application that runs automated tasks or scripts over the Internet. Typically, bots perform tasks that are both simple and structurally repetitive at a much higher rate than would be possible for a person. A chatbot is a particular type of bot and, as used herein, is defined as a piece of software and/or hardware that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, while simpler ones scan for keywords within the input and then select a reply from a database based on matching keywords or wording pattern.

Before proceeding further with the description of the present invention, an explanatory note will be provided in regard to referencing system components—e.g., modules, servers, and other components—that have already been introduced in any previous figure. Whether or not the subsequent reference includes the corresponding numerical identifiers used in the previous figures, it should be understood that the reference incorporates the example described in the previous figures and, unless otherwise specifically limited, may be implemented in accordance with either that examples or other conventional technology capable of fulfilling the desired functionality, as would be understood by one of ordinary skill in the art. Thus, for example, subsequent mention of a "contact center system" should be understood as referring to the exemplary "contact center system 200" of FIG. 2 and/or other conventional technologies for implementing a contact center system. As additional examples, a subsequent mention below to a "customer device", "agent device", "chat server", or "computing device" should be understood as referring to the exemplary "customer device 205", "agent device 230", "chat server 240", or "computing device 200", respectively, of FIGS. 1-2, as well as conventional technology for fulfilling the same functionality.

Chat features and chatbots will now be discussed in greater specificity with reference to the exemplary embodiments of a chat server, chatbot, and chat interface depicted, respectively, in FIGS. 3, 4, and 5. While these examples are provided with respect to chat systems implemented on the contact center-side, such chat systems may be used on the customer-side of an interaction. Thus, it should be understood that the exemplary chat systems of FIGS. 3, 4, and 5 may be modified for analogous customer-side implementation, including the use of customer-side chatbots configured to interact with agents and chatbots of contact centers on a customer's behalf. It should further be understood that chat features may be utilized by voice communications via converting text-to-speech and/or speech-to-text.

Referring specifically now to FIG. 3, a more detailed block diagram is provided of a chat server 240, which may be used to implement chat systems and features. The chat server 240 may be coupled to (i.e., in electronic communication with) a customer device 205 operated by the customer over a data communications network 210. The chat server 240, for example, may be operated by a enterprise as part of a contact center for implementing and orchestrating chat conversations with the customers, including both automated chats and chats with human agents. In regard to automated chats, the chat server 240 may host chat automation modules or chatbots 260A-260C (collectively referenced as 260), which are configured with computer program instructions for engaging in chat conversations. Thus, generally, the chat server 240 implements chat functionality, including the exchange of text-based or chat communications between a customer device 205 and an agent device 230 or a chatbot 260. As discussed below, the chat server 240 may include a customer interface module 265 and agent interface module 266 for generating particular UIs at the customer device 205 and the agent device 230, respectively, that facilitate chat functionality.

In regard to the chatbots 260, each can operate as an executable program that is launched according to demand. For example, the chat server 240 may operate as an execution engine for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may further provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. In example embodiments, the chat server 240 is configured to orchestrate the sharing of data among the various chatbots 260 as interactions are transferred or transitioned over from one chatbot to another or from one chatbot to a human agent. The data captured during interaction with a particular chatbot may be transferred along with a request to invoke a second chatbot or human agent.

In exemplary embodiments, the number of chatbots 260 may vary according to the design and function of the chat server 240 and is not limited to the number illustrated in FIG. 3. Further, different chatbots may be created to have different profiles, which can then be selected between to match the subject matter of a particular chat or a particular customer. For example, the profile of a particular chatbot may include expertise for helping a customer on a particular subject or communication style aimed at a certain customer preference. More specifically, one chatbot may be designed to engage in a first topic of communication (e.g., opening a new account with the business), while another chatbot may be designed to engage in a second topic of communication (e.g., technical support for a product or service provided by the business). Or, chatbots may be configured to utilize different dialects or slang or have different personality traits or characteristics. Engaging chatbots with profiles that are catered to specific types of customers may enable more effective communication and results. The chatbot profiles may be selected based on information known about the other party, such as demographic information, interaction history, or data available on social media. The chat server 240 may host a default chatbot that is invoked if there is insufficient information about the customer to invoke a more specialized chatbot. Optionally, the different chatbots may be customer selectable. In exemplary embodiments, profiles of chatbots 260 may be stored in a profile database hosted in the storage device 220. Such profiles may include the chatbot's personality, demographics, areas of expertise, and the like.

The customer interface module 265 and agent interface module 266 may be configured to generate user interfaces (UIs) for display on the customer device 205 that facilitate chat communications between the customer and a chatbot 260 or human agent. Likewise, an agent interface module 266 may generate particular UIs on the agent device 230 that facilitate chat communications between an agent operating an agent device 230 and the customer. The agent interface module 266 may also generate UIs on an agent device 230 that allow an agent to monitor aspects of an ongoing chat between a chatbot 260 and a customer. For example, the customer interface module 265 may transmit signals to the customer device 205 during a chat session that are configured to generated particular UIs on the customer device 205, which may include the display of the text messages being sent from the chatbot 260 or human agent as well as other non-text graphics that are intended to accompany the text messages, such as emoticons or animations. Similarly, the agent interface module 266 may transmit signals to the agent device 230 during a chat session that are configured to generated UIs on the agent device 230. Such UIs may include an interface that facilitates the agent selection of non-text graphics for accompanying outgoing text messages to customers.

In exemplary embodiments, the chat server 240 may be implemented in a layered architecture, with a media layer, a media control layer, and the chatbots executed by way of the IMR server 216 (similar to executing a VoiceXML on an IVR media server). As described above, the chat server 240 may be configured to interact with the knowledge management server 234 to query the server for knowledge information. The query, for example, may be based on a question received from the customer during a chat. Responses received from the knowledge management server 234 may then be provided to the customer as part of a chat response.

Referring specifically now to FIG. 4, a block diagram is provided of an exemplary chat automation module or chatbot 260. As illustrated, the chatbot 260 may include several modules, including a text analytics module 270, dialog manager 272, and output generator 274. It will be appreciated that, in a more detailed discussion of chatbot operability, other subsystems or modules may be described, including, for examples, modules related to intent recognition, text-to-speech or speech-to-text modules, as well as modules related to script storage, retrieval, and data field processing in accordance with information stored in agent or customer profiles. Such topics, however, are covered more completely in other areas of this disclosure—for example, in relation to FIGS. 6 and 7—and so will not be repeated here. It should nevertheless be understood that the disclosures made in these areas may be used in analogous ways toward chatbot operability in accordance with functionality described herein.

The text analytics module 270 may be configured to analyze and understand natural language. In this regard, the text analytics module may be configured with a lexicon of the language, syntactic/semantic parser, and grammar rules for breaking a phrase provided by the customer device 205 into an internal syntactic and semantic representation. The configuration of the text analytics module depends on the particular profile associated with the chatbot. For example, certain words may be included in the lexicon for one chatbot but excluded that of another.

The dialog manager 272 receives the syntactic and semantic representation from the text analytics module 270 and manages the general flow of the conversation based on a set of decision rules. In this regard, the dialog manager 272 maintains a history and state of the conversation and, based on those, generates an outbound communication. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language.

During the chat conversation, the dialog manager 272 selects a response deemed to be appropriate at the particular point of the conversation flow/script and outputs the response to the output generator 274. In exemplary embodiments, the dialog manager 272 may also be configured to compute a confidence level for the selected response and provide the confidence level to the agent device 230. Every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, transfer to a human agent to assist, and the like. The confidence level may be utilized to assist the system with deciding whether the detection, analysis, and response to the customer input is appropriate or whether a human agent should be involved. For example, a threshold confidence level may be assigned to invoke human agent intervention based on one or more business rules. In exemplary embodiments, confidence level may be determined based on customer feedback. As described, the response selected by the dialog manager 272 may include information provided by the knowledge management server 234.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an output text to be displayed at the customer device 205. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Reference will now be made to FIG. 5, in which a webpage 280 having an exemplary implementation of a chat feature 282 is presented. The webpage 280, for example, may be associated with an enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. In general, the chat feature 282 may include an exemplary way for customers to enter text messages for delivery to a contact center.

As an example, the webpage 280 may be accessed by a customer via a customer device, such as the customer device, which provides a communication channel for chatting with chatbots or live agents. In exemplary embodiments, as shown, the chat feature 282 includes generating a user interface, which is referred to herein as a customer chat interface 284, on a display of the customer device. The customer chat interface 284, for example, may be generated by the customer interface module of a chat server, such as the chat server, as already described. As described, the customer interface module 265 may send signals to the customer device 205 that are configured to generate the desired customer chat interface 284, for example, in accordance with the content of a chat message issued by a chat source, which, in the example, is a chatbot or agent named "Kate". The customer chat interface 284 may be contained within a designated area or window, with that window covering a designated portion of the webpage 280. The customer chat interface 284 also may include a text display area 286, which is the area dedicated to the chronological display of received and sent text messages. The customer chat interface 284 further includes a text input area 288, which is the designated area in which the customer inputs the text of their next message. As will be appreciated, other configurations are also possible.

Automated Interactions with Browsing Customers

Online retailers and social websites have long struggled with engaging and retaining browsing customers. Often such customers abandon browsing sessions before sales are compete or leads or registrations generated. Prior to advent of automated chat resources, or chatbots, retailers primarily relied on exit pop ups or follow-up emails to attempt to recover lost customers or to cross-sell or up-sell them. A chatbot—also known as "virtual agent", "artificial intelligence agent" or "chat bot"—is a computer program designed to simulate an intelligent conversation with one or more human users via auditory or textual methods. In the context of websites, chatbots are primarily used to engage customers and answer questions they may have in regard to the particular webpage being shown. A chatbot, or chatbot feature, is generally provided via an overlay interface that is generated within the user interface, i.e., integrated within the webpage as discussed above. Chatbots have served to improve retailers chances of completing sales or generating leads or customer registrations. In general, this is because confused or frustrated customers, i.e., customers with unanswered questions, are much more likely to abandon a website during a browsing session. Chatbots are able to provide the answers that alleviate such confusion and frustration, while also engaging the customer and lengthening the browsing session, which leads to better business outcomes.

Even so, to realize the benefits associated with chatbots, it still remains essential that the customer is properly engaged and remains so engaged while browsing the website. And, in cases where the customer is confused about the website or a product offering, the associated business still requires the customer to choose to take the action of engaging the chatbot with a question. Along with this, it is also critical that the customer be able to ask the right question, i.e., be able frame the question in the right way to get the response they want. In regard to the former, it is well known that customers often lack the motivation to make the effort of engaging a chat feature with a typed in question. This is true even with the advent of auto fill functionality that may aid a customer by completing questions that are started via the customer. Further, as stated, it is still another task that the customer ask the right question, i.e., the question that gets the customer the information they seek. In certain instances, the appropriate question to ask may be straightforward. In others, however, the customer may not have the requisite knowledge to frame the question in the right way. In those instances, the customer's frame of mind, whether it be frustration or embarrassment, may cause them to abandon the website. As will be seen, the present invention is designed to effectively reduce shopping cart, lead and registration abandonment. The present invention also has the capability of powering up-selling and cross-selling opportunities as well, while providing the customer with a satisfactory experience. Further, the present invention is customer friendly and can provide realtime data reporting for online retailers. The present invention assists in increased revenue opportunities while meeting the changing needs of the growing online market.

In a typical situation, when a customer has a query about an item or feature on a webpage, the customer has to start a conversation with the chatbot in the usual way. This means typing in the query, so that the chatbot understands what information the customer seeks. It is immaterial as to whether the chatbot is an advanced chatbot powered by generative AI (like ChatGPT), the customer still has to input in the query. Only once the question is posed is the chatbot able to provide the response or other options that constitute the chatbot's output. If the chatbot is not clear about the intended query of the customer, the conversation continues until the context is understood correctly or the customer abandons in frustration.

As will be seen, the present invention offers enhanced functionality that addresses these operational shortcomings. In accordance with exemplary embodiments, the chatbot, or chatbot feature, in a webpage is enhanced with functionality that provides a pointing tool to the customer that, upon engaging, allows the customer to select any visual element displayed within the current webpage. The selected visual element then becomes a "point of interest" indication that is used to generate a query on the customer's behalf. In accordance with exemplary embodiments, the web element associated with the selected visual element is first determined, i.e., the customer's indication made by the pointing tool is linked to a particular web element used in rendering the webpage. The identified web element then becomes the indicator of the customer's "point of interest" within the webpage that is used to perform a search. As used herein, the web element may include a text web element or image web element, each of which may be referred to generally as a "web element".

In accordance with certain embodiments, the identified web element (which, for example, may include a selected portion of text or an image) is then used in a search to determine or confirm a context associated with the web element. Aspects of this search and how it is conducted are discussed below. As used herein, this search may retrieve what will be referred to as "associated data", which is data that adds further detail and/or confirms a context relative to the customer's point of interest on the webpage. Such associated data, for example, may include data related to the web element, such as metadata provided by an operator or product manager associated with the webpage, as well as other data retrieved via the search that is found to be associated to the matching data in accordance with a predetermined criterion. For example, the web element used in the search may include only partial text. In finding the matching data, the full text may be retrieved providing a fuller understanding as the intention of the customer. Aspects as to the determination of such associated data is discussed more below.

In accordance with exemplary embodiments, the associated data is then provided to the chatbot for auto-generating a query for the customer. In exemplary embodiments, the chatbot uses the derived associated data to gain an understanding of the customer's most likely query and then provides options or responses in accordance therewith. As used herein, this functionality or feature may be referred to as a point of interest query generator. In an example, as discussed below, an option may be provided in the chatbot window that the customer can click (i.e., activate) and thereby enable the point of interest query generator. The customer can then use the point of interest query generator to select a visual element on a webpage that the customer is currently viewing. For example, the visual element could be text or an image that is rendered on the webpage. The selected point of interest then becomes both an initiating event for a query and the basis for determining what the type of information that the customer is seeking with the initiated query. In this way, the need for the customer to type in the query is bypassed.

In certain embodiments, the response provided to the customer is a list of possible queries, with the customer being prompted to select the one that is closest to the questions they have. In other embodiments the customer may be presented with the query calculated as the one most likely for the customer given the point of interest that the customer selected. The customer may be asked to confirm whether this is the question the customer would like to ask. In other embodiments, the chatbot selects the customer's most likely query based on the point of interest selected and provides an informative response automatically along with the query.

It will be understood that the point of the interest selected by the customer may be used to calculate the customer's most likely query. In other embodiments, the point of interest may be paired with other information known or determined about the customer to more accurately derive the customer's most likely query. Such other information may include any other information traditionally used by a contact center to determine customer intent. For example, any biographical information known about the customer may be combined with the point of interest selection. Prior purchases by the customer may also be used in combination with the point of interest selection as an additional input to determine the customer's most likely query. Another input may be the prior browsing behavior of the customer. Such prior browsing behavior may constitute behavior that occurred in a prior browsing session. Additionally, such prior browsing behavior may constitute behavior that occurred in the current (or common) browsing session, including webpages already visited and queries already generated by the customer via use of the point of interest query generator.

Figure 6:
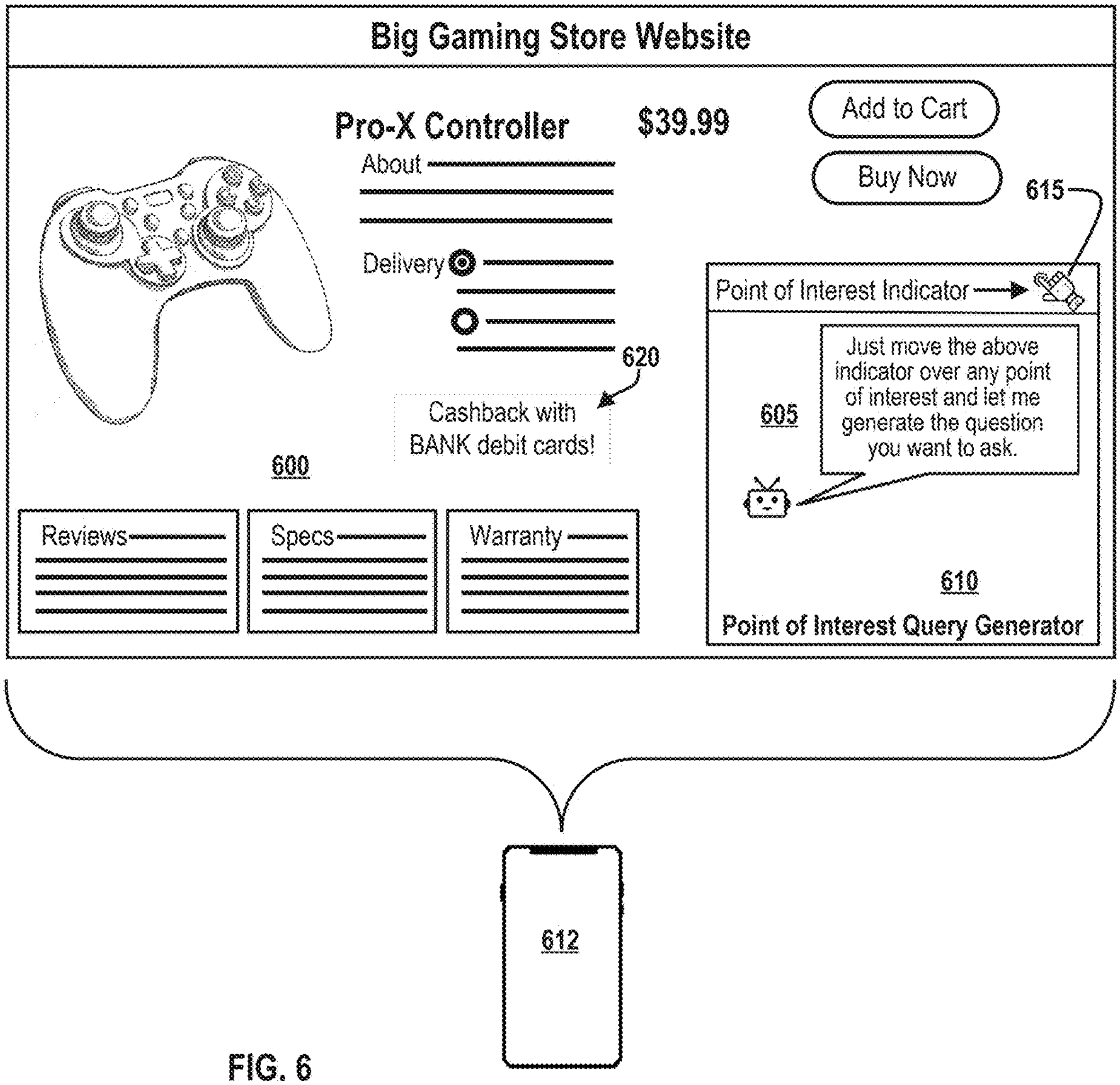
FIG. 6 is an exemplary website having an integrated chatbot feature with a point of interest query generator in accordance with an embodiment of the present invention.

Reference will now be made to FIG. 6, in which a webpage 600 having an exemplary implementation of a chat feature 605 is presented in combination with a point of interest query generator 610 of the present invention. As indicated, the webpage 605 may be associated with an enterprise website and intended to initiate interaction between prospective or current customers visiting the webpage and a contact center associated with the enterprise. In the example provided, the webpage relates to "Big Gaming Store", and the current webpage is one generated in relation to the sale of a gaming controller product called "Pro-X Controller". As will be appreciated, the chat feature 605 and point of interest query generator 610 may be generated on any type of customer device, including personal computing devices such as laptops, tablet devices, or smart phones. In the example provided, the customer device is a smart phone 612. Further, the chat feature 605 may be generated as a window or overlay within a webpage 600. As in the example shown, the chat feature 605 may be contained within a defined portion of the webpage 600 and, for example, may be implemented as a widget via the systems and components described above and/or other conventional means. In general, the chat feature 605 may include an exemplary way for customers to enter text messages for delivery to resources within a contact center, including automated resources, such as a chatbot.

As an example, the webpage 600 may be accessed by a customer via a customer device, such as the smart phone 612, which provides a communication channel for chatting with a chatbot. In exemplary embodiments, as shown, the chat feature 605 includes generating a user interface, which is referred to herein as a chat interface, on a display of the customer device 612. The chat interface, for example, may be generated by the customer interface module of an associated chat server, such as the chat server discussed above. As described, a customer interface module may send signals to the customer device 612 that are configured to generate the desired chat interface, for example, in accordance with the content of a chat message issued by a chat source. In the example, the chat source is a chatbot, as indicated by the bot icon that is shown. The chat interface may be contained within a designated area or window, with that window covering a designated portion of the webpage 600. The chat interface also may include a text display area, which is the area dedicated to the chronological display of text messages. In alternative embodiments, the chat interface may further include a text input area, which is the designated area in which the customer inputs the text of their next message. As will be appreciated, in the embodiment that is provided, instead of inputting text, the customer can generate questions by using a point of interest indicator 615. As will be appreciated, further instructions may be provided within the chat interface that explains to the customer how to use the point of interest indicator 615.

In accordance with exemplary embodiments, the point of interest indicator 615 is conspicuously configured as a pointing tool that is provided within the point of interest query generator 610. The point of interest indicator 615 can be engaged and manipulated by a customer to indicate a point of interest within the webpage 600. In the example provided, this is done by engaging the point of interest indicator 615, for example, touching it with a finger on a touch screen. The point of interest indicator 615 may then be dragged so that it is over (or visually covers or points to) a visual element displayed in the webpage 600. As described, the visual element may correspond to a particular web element, i.e., text or picture appearing or contained within a particular webpage. The customer may then select a particular visual element (which is associated with a particular web element), which then becomes the customer's point of interest. As described below, the selection by the customer of a visual element may be accomplished in different ways. For example, the customer may "click on" a particular visual element when the point of interest indicator 615 is positioned over it, e.g., by left clicking a mouse or double tapping the screen of a smart phone. Alternatively, the customer may hover the point of interest indicator 615 for a minimum amount of time, for example, 1-3 seconds, over the particular visual element, with the selection taking place once the prescribed minimum amount of time is satisfied. This time period may be referred to as a "minimum hover time" for making a selection. With such functionality, a visual countdown indicator may be provided to accompany the point of interest indicator 615 to indicate that the minimum hover time is accruing, which signals to the customer to either maintain the point of interest indicator 615 in the same place, if it happens to be over the visual element that the customer has a question about, or move the point of interest indicator 615 elsewhere, if this is not the case. The visual countdown indicator, for example, may be the point of interest indicator 615 filling with a fill color. In another embodiment, the countdown indicator may be a question mark that appears with a circle being subscribed about it such that the circle fully subscribing about the question mark marks the completion of the countdown. The point of interest indicator 615 may be used to indicate interest in any of visual element shown on the webpage, for example, those associated with web elements that provide text, pictures, or other visual features. This may include text describing offers, such as the "Cashback with BANK debit cards!" offer 620, which will be discussed below in relation to another example.

Figure 7:
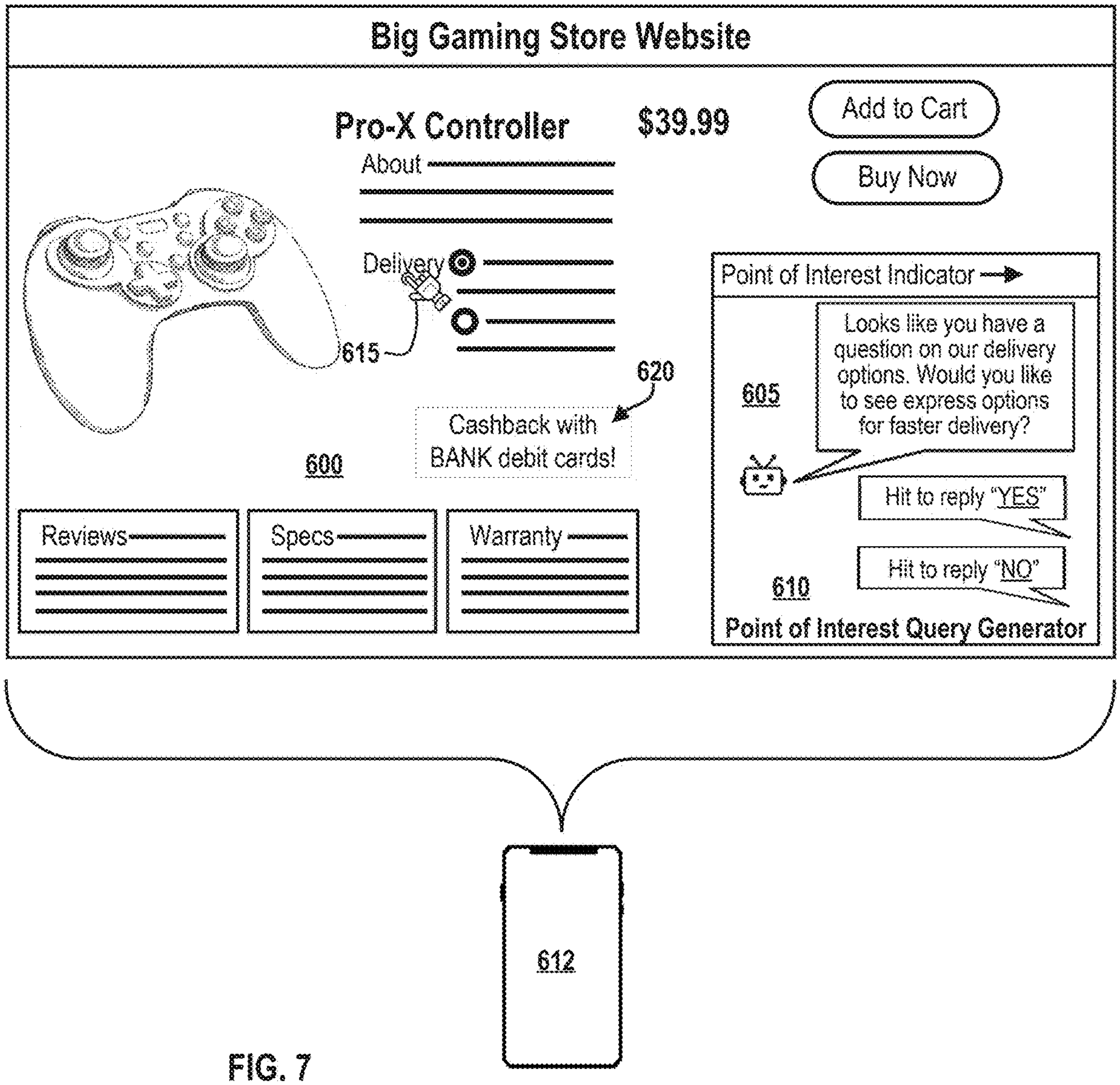
FIG. 7 is the website of FIG. 6 demonstrating functionality in relation to the point of interest query generator in accordance with an embodiment of the present invention.

With reference also to FIG. 7, functionality of the point of interest indicator 615 is further illustrated in accordance with an exemplary embodiment. In this example, the point of interest indicator 615 has been engaged and moved by the customer so that it points to or covers a particular visual element, which in the depicted example is the visual element associated with the "Delivery" text. As described below, this indication by the customer of a "point of interest" is then used to generate the customer's most likely query, which can then be confirmed by the customer and posed to the chatbot for answering. For the sake of the example, the particular customer is one who has ordered from the website before and, for past orders, has requested express delivery. This past behavior exhibited by the customer may be ascertained via searching a customer database of past orders associated with the particular customer and ascertaining the delivery methods associated therewith. Given the point of interest and this customer information, the point of interest query generator 610 may generate as the customer's most likely query: "Looks like you have a question on our delivery options. Would you like to see express options for faster delivery?" As a way for the customer to reply, the chat interface may generate query affirming replies for the customer, in which one states "[Hit to reply 'YES']" and the other states "[Hit to reply 'NO']". In this way, the customer only has to hit (i.e., click) one of the query affirming replies to confirm that, "YES", the generated query is the one that the customer wanted to ask, or "NO", the generated query is not the question that the customer wanted to ask. In other embodiments, the point of interest query generator may proceed directly to the response without confirming the question. In such cases, the query being answered may be displayed in the chat interface along with the response.

After receiving the response, the customer may reengage the point of interest indicator 615 and select a different visual element, thereby generating another query. For example, the customer may use the point of interest indicator 615 to select any of the visual elements displayed in the webpage display and generate a different query. Each query may be used as customer behavior information for discerning the customer's next most likely query.

Figure 8:
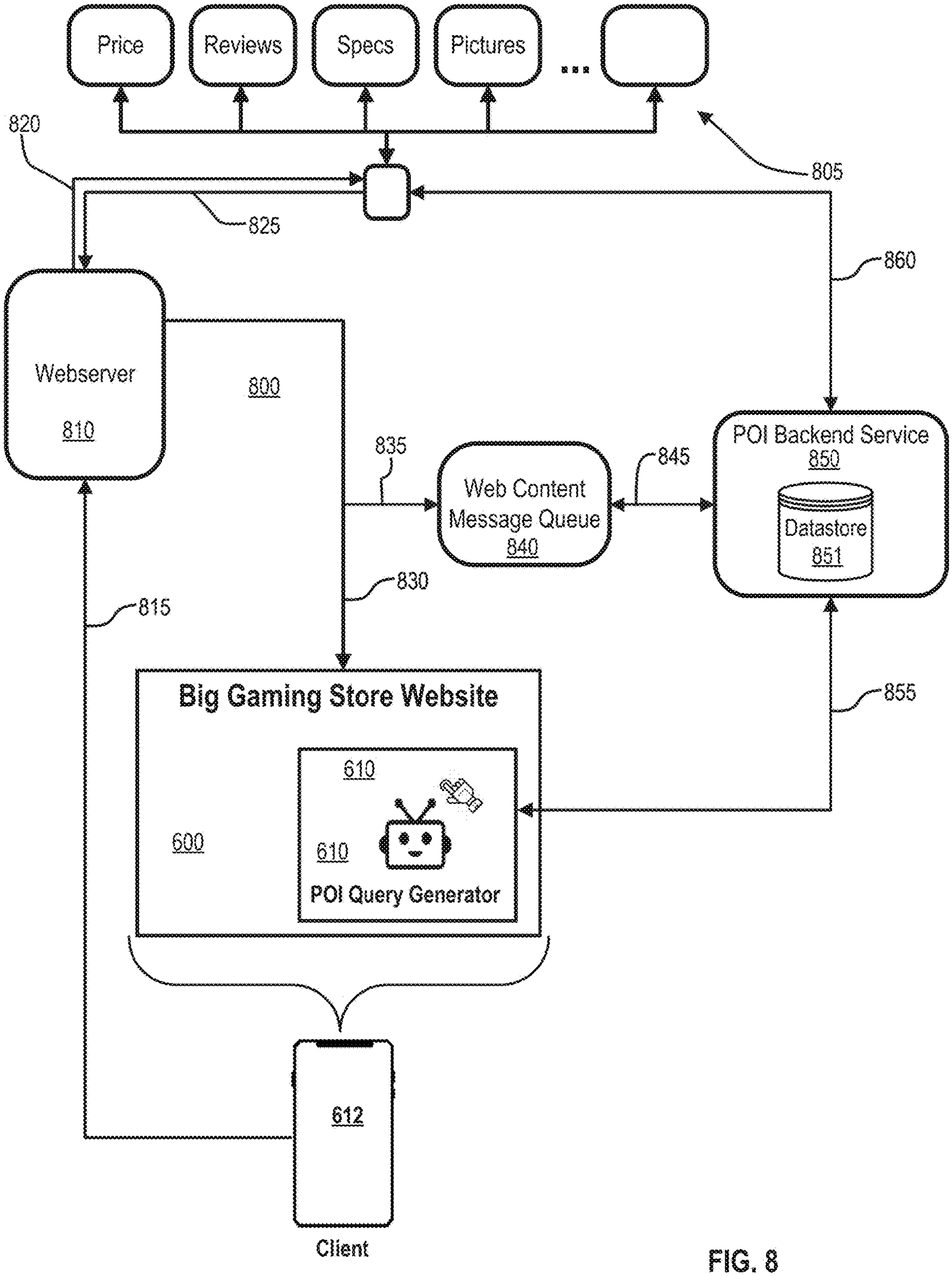
FIG. 8 is an exemplary system for implement a chatbot feature having a point of interest query generator in accordance with an embodiment of the present invention.

With reference now to FIG. 8, a system 800 is shown for achieving the above-described functionality related to the point of interest query generator in accordance with an exemplary embodiment. As will be appreciated, multiple backend services 805 may be included for providing data and other resources needed to render webpages or mobile application user interfaces (UI). For example, in any online retailer, a typical product webpage may include a range of data and other information, like price, reviews, specifications, pictures, etc., that together describe a product being offered. These details may be used to render a requested UI from various backend services 805 via a webserver 810. Once the request for a particular webpage 600 is provided from the client 612, the webserver 810 constructs the webpage 600 by gathering the necessary images, text, and data from the backend services 805, with the webpage 600 then being assembled on the display of the user device 612 in accordance therewith. The backend services 805 may also include access to customer and interaction databases, such as those described in relation to FIG. 1.

In accordance with the present invention, a service is proposed that listens or queues the information or messages that provide the assembled web elements used to render a given webpage or UI. This may be done through a message queue derived from the webserver 810 as the webpage 600 is rendered on the customer's user device. For example, the proposed listening service collects the requested product information and other web elements through message queues and, as will be seen, then persist this data within a datastore, such as Elasticsearch, so that fast paced search and retrieval therefrom is enabled. The information, like price, delivery dates, possible discounts, reviews, offers and other related information is then made available via Elasticsearch for facilitating the functionality associated with the point of interest query generator 610, which includes determining what visual element the customer selects in the webpage via the point of interest indicator 615 and informing the chatbot feature of that selection and the associated context so to inform the process by which a query is generated.

More specifically, the process of the present invention may proceed as follows. First, the user searches for a particular product, which in the previous example is the Pro-X Controller, on an ecommerce website, e.g., the Big Gaming Store website. This search triggers the browser of the user device 612 to send a request 815 to the webserver 810 for a particular webpage, which is webpage 600.

This request 815 then triggers the webserver 810 to send requests 820 to the backend services 805 to collect the required information or web content messages (i.e., which may be referred to generally as web content) needed to render webpage 600. Once collected, the web content is then transmitted 825 to the webserver 810 as web content messages. The webserver 815 then transmits 830 the collected web content, i.e., web content messages, to the browser of the user device 612, which receives the web content and uses it to render the webpage 600 for display to the customer.

Concurrently, the message service queues the web content messages 835 associated with the web content of webpage 600 in a web content message queue 840. The purpose of the web content message queue 840 is to deliver the web content messages used to render the relevant webpage to a particular backend service associated with the point of interest query generator, which may be referred to herein as a point of interest backend service 850 (or "POI Service" 850 in FIG. 8). The point of interest backend service 850 may be configured to receive web content messages from the web content message queue 840, with the point of interest backend service 850 providing backend services in relation to the point of interest query generator 610 in accordance with described functionality. As illustrated, in accordance with exemplary embodiments, the point of interest backend service 850 may include a datastore 851, for example Elasticsearch, for storing the received web content messages. Once stored in the datastore 851, the web content messages may be referred herein as "stored web content messages".

Thus, in exemplary embodiments, the point of interest backend service 850 causes the web content messages associated with a given webpage to persist in a searchable database, as represented by the datastore 851. In an exemplary embodiment, within the datastore 851, the web content messages persist as an Elasticsearch cluster, which enables fast paced searching and retrieval of information. As will be appreciated, data can be sent in the form of JSON documents to Elasticsearch using an API or ingestion tools such as Logstash and Amazon Data Firehose. Elasticsearch automatically stores the original documents or data and adds a searchable reference to the document in the cluster's index, which can then be searched and retrieved using the Elasticsearch API.

In the system 800, the chat feature 605 and/or the point of interest query generator 610 may communicate 855 with the point of interest backend service 850 via a network and in this way be able to search and retrieve information from the stored web content messages found in the datastore 851.

To take another example, let's consider the "Cashback with BANK debit cards" offer 620 found in the webpage 600. If the customer has a query about the offer 620, the customer can use the point of interest indicator 615 to select the visual element associated with it, which is the text of the offer itself, i.e., the text "Cashback with BANK debit cards". In accordance with exemplary embodiments, the customer engages the point of interest indicator 615 and moves it so to select the offer text (i.e., "Cashback with BANK debit cards"). This may be accomplished in the same manner as shown above in relation to how the customer selected "Delivery" in FIG. 7. For example, the customer may hover the point of interest indicator 615 over the "Cashback with BANK debit cards" text so that a minimum hover time is satisfied. That is, the hovering feature may be configured to activate a selection for the customer after a predetermined minimum amount of time has passed (i.e., the "minimum hover time") during which the point of interest indicator 615 is maintained over the same web element. Alternatively, the point of interest indicator may be configured so that the customer can affirmatively click on or otherwise select a given visual element. In exemplary embodiments, the selection of a visual element may then cause the point of interest indicator 615 to remain over the selected web element, thereby providing a reminder to the customer of the particular visual element that has been selected. The point of interest indicator 615 may remain in that location until the customer reengages to tool to make another selection. It may also return to its original position after a timeout period.

Once the customer has selected a visual element, conventional capabilities may be employed to recognize the web element (i.e., particular image or text) associated with the visual element. For example, in Javascript, to ascertain currently selected text, a "window.getSelection" method may be used to return a selection object that represents the text that the customer selected.

Once the selected web element is determined (which is the web element associated with the visual element indicated by the customer, i.e., the customer's point of interest), the selected web element may be transmitted to the point of interest backend service 850. In accordance with exemplary embodiments, the REST endpoint in the point of interest backend service 850 may receive the text associated with the selected web element and, in response to receiving the text, use the text to search of the stored web content messages in the datastore 851 to find matching data therewithin. Upon finding the matching data, data associated with the matching data, which will be referred to herein as "associated data" may then be determined. As used herein, associated data is data stored in the stored web content messages in relation to the matching data that provides additional context than that provided via the web element, examples of which are provided above. The associated data may then be provided to the chatbot for generating the query for the customer. For example, in regard to the example, the text "Cashback with use of BIG BANK debit cards" may be found to match matching data found in the stored web content messages (e.g., found to exact match text found in the stored web contents message). Along with the matching data—i.e., "Cashback with use of BIG BANK debit card"—associated data may be found within the stored web content messages that confirms that the product for which the offer applies (for example, associated data found relating to the matching data in the stored web content messages may affirmatively state that the offer applies to the "Pro-X Controller" product as well as a list of other controllers). Other associated data may be found within the stored web content messages that further describes the nature of the offer, i.e., explaining that the offer provides a certain percentage of cash back when the customer pays for the purchase of the Pro-X Controller using a debit card from BIG BANK. As stated, other information about the customer may also be used to determine the most likely query for the customer. For example, if prior browsing activity of the customer indicates the customer looked at another controller for which the same offer applies, it may be assumed that the customer would most likely want to ask if the same offer applies to any other controllers. In any case, the determined associated data is provided to the chatbot framework for determining a query and/or response to provide to the customer. With this additional information, the chatbot is able to more fully understand the context of the customer's questions and respond appropriately with information that is deemed most relevant to the customer. This, for example, may be determined to be information that it is deemed likely that the customer still lacks given previous browsing activity but would be interested in knowing. In relation to basic chatbot functionality, the chatbot can use the result to confirm the customer's most likely query or simply respond with a canned response or set of responses, which are those response provided in relation to the topic identified via the point of interest. In regard to an AI powered chatbot, the chatbot may use the associated data determined in relation to the selected point of interest (i.e., the information returned from the backend service 850), together with any other inputs known about the customer, to make a more intelligent assessment of the customer's most likely query and appropriate response thereto. Data associated with the data element associated with the selected point of interest may also be part of the information provided to the chatbot for generating the query.

Figure 9:
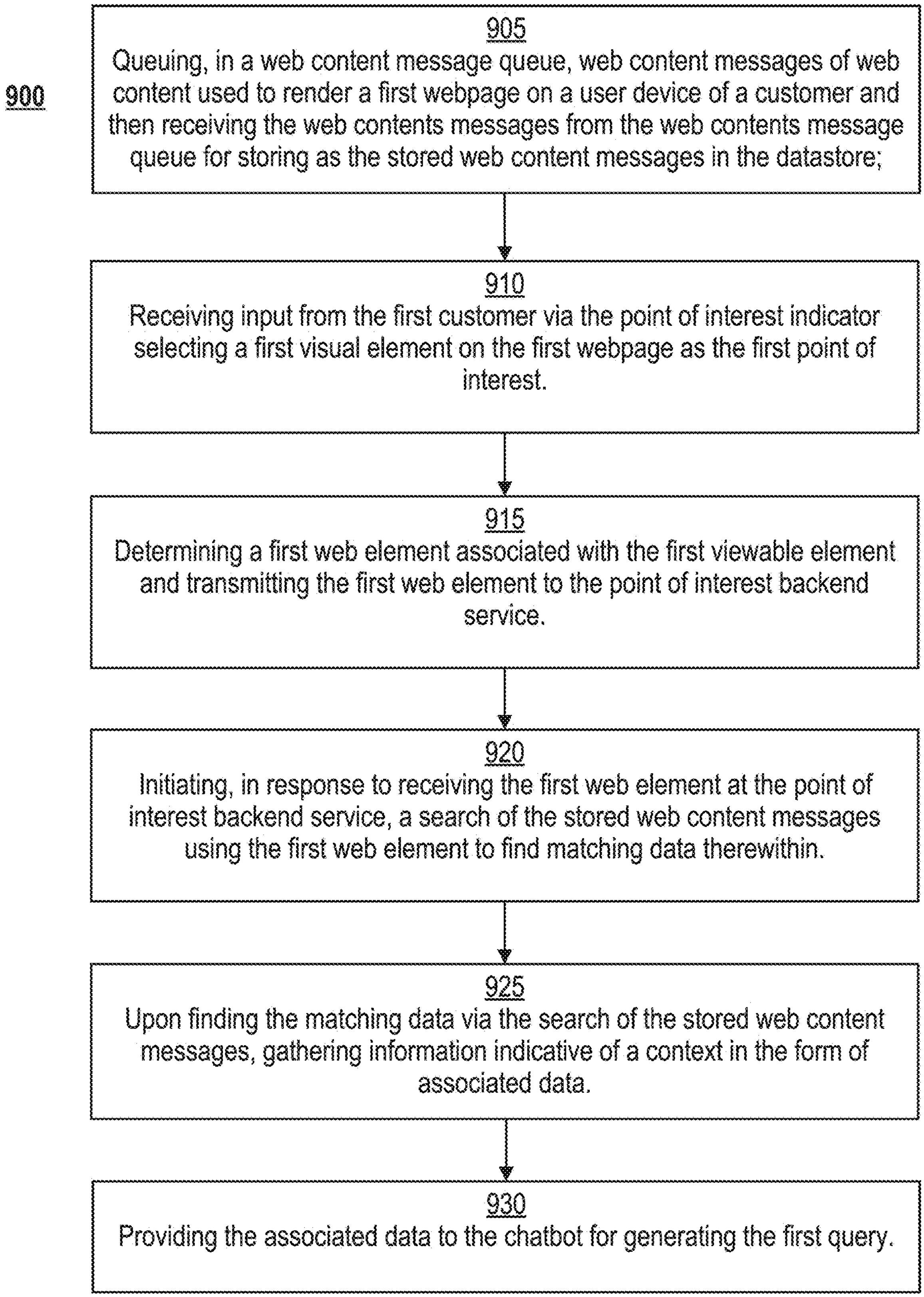
FIG. 9 exemplary method of operation of a point of interest query generator in accordance with an embodiment of the present invention.

With reference now to FIG. 9, an exemplary method 900 is shown that illustrates a query generation process of the present invention. As already described, the method 900 may facilitate generating a query on behalf of a customer based on a point of interest identified on a webpage by the customer. As initial requirements toward executing method 900, a chatbot feature may be generated as part of a webpage that is being displayed on a user device of a customer. The chatbot feature may include a point of interest indicator that includes a pointing tool for indicating a point of interest on the webpage. The pointing tool may have an engageable icon that, once engaged, is operably movable by the customer for selecting a visual element on the webpage as the customer's point of interest. For example, in a preferred embodiment the pointing tool of the point of interest locator may be visibly generated in the user display as a pointing hand or, more particularly, a pointing robot or bot hand. A point of interest backend service also may be provided. The point of interest backend service may be communicationally linked via a network to each of the chatbot feature, a web contents message queue, and a datastore for storing stored web content messages. In the example that follows, the query generation process of the method 900 is described in relation to the generation of a first query in response to a customer indicating a first point of interest on a first webpage.

The method 900 begins, at step 905, by queuing, in the web content message queue, web content messages of web content used to render the first webpage on the user device of the customer and then receiving, e.g., via the point of interest backend service, the web content messages from the web content message queue for storing as stored web content messages in a datastore.

At step 910, the method 900 continues by receiving input from the customer via the point of interest indicator selecting a first visual element on the first webpage as the first point of interest. The first web element may include text (i.e., a text web element) or an image (i.e., an image web element).

At step 915, the method 900 continues by determining a first web element associated with the first visual element and transmitting the first web element to the point of interest backend service.

At step 920, the method 900 continues by initiating, in response to receiving the first web element at the point of interest backend service, a search of the stored web content messages using the first web element to find matching data therewithin. For example, the matching data may be defined as data stored in the stored web content messages that is found to match the first web element.

At step 925, the method 900 continues by, upon finding the matching data via the search of the stored web content messages, gathering information indicative of a context in the form of associated data. In exemplary embodiments, the associated data is data determined to be stored in association with the matching data in the stored web content messages.

In exemplary embodiments, a predetermined criterion may be used to determine if data stored in the stored web content messages comprises associated data in relation to the matching data via. For example, the predetermined criterion may be a criterion defining associated data as being meta data associated with the matching data. In other embodiments, the predetermined criterion may be a criterion defining the associated data as being data associated with other web elements linked to the first web element. Such linkage may be proximity of the web elements in the generated display. In other embodiments, the predetermined criterion may include a criterion defining the associated data as comprising continuation text related to text of the first web element. In such a case, the text selected by the customer may have been partial or incomplete. The associated data may then be continuation text that renders the selected text complete.

At step 930, the method 900 continues by providing the associated data to the chatbot for generating the first query. Certain embodiments may further include the step of generating the first query via the chatbot feature based on the associated data. In other embodiments, data derived from the first web element may also be provided with the associated data to the chatbot feature for generating the first query. In such cases, the step of generating the first query via the chatbot feature is based on the associated data and the data derived from the first web element. As will be appreciated, the first query may include a most likely query of the customer given the selection of the first visual element as the first point of interest based on the associated data found in association with the first web element that corresponds therewith.

In certain embodiments, the query generation process further includes displaying the generated first query in a text display area of the chat feature. In such cases, a prompt may be displayed in the text display area having one or more query affirming replies related to the first query for selecting by the customer to affirm that the first query comprises a query for which the customer wants to receive an answering response. Given this functionality, the query generation process may further include receiving a second input from the customer in relation to the prompt indicating a selection by the customer of the one or more query affirming replies. The second input may be provided by the customer via use by the customer of pointing tool of the point of interest indicator.

In certain embodiments, the query generation process may further include determining other information describing a characteristic of the customer. In such cases, the associated data and the other information about the customer may be provided to the chatbot feature for generating the first query. In such embodiments, the described characteristic may be previous browsing activity of the customer. In certain embodiments, the previous browsing activity of the customer may be browsing activity occurring before the first input and within a common (i.e., the same) browsing session as the first input. The previous browsing activity may relate to the generation of a previous query in response to the customer indicating another point of interest on the first webpage. In other embodiments, the other information may include a previous purchase made by the customer from a business associated with the first page. In such cases, the point of interest backend service may determine an identity of the customer and then search customer databases for such previous purchases. Other relevant information about the customer may also be retrieved.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for generating a query for a customer based on a point of interest identified on a webpage by the customer, the method comprising:

generating, as part of a webpage being displayed on a user device of a customer, a chatbot feature, the chatbot feature comprising a point of interest indicator that includes a pointing tool for indicating a point of interest on a webpage, the pointing tool having an engageable icon that, once engaged, is operably movable by the customer for selecting a visual element on the webpage as the point of interest;

providing a point of interest backend service communicationally linked via a network to each of the chatbot feature, the web content message queue, and a datastore; and executing a query generation process to generate a first query in response to the customer indicating a first point of interest on a first webpage, the query generation process comprising:

queuing, in the web content message queue, web content messages of web content used to render the first webpage on the user device of the customer;

receiving the web content messages from the web content message queue and storing the web content messages as stored web content messages in the datastore;

receiving a first input from the customer via the point of interest indicator selecting a first visual element on the first webpage as the first point of interest;

determining a first web element associated with the first visual element and transmitting the first web element to the point of interest backend service;

initiating, in response to receiving the first web element at the point of interest backend service, a search of the stored web content messages using the first web element to determine if matching data is contained therewithin;

upon finding the matching data via the search of the stored web content messages, gathering associated data indicative of a context related to the first query, the associated data comprising data determined to be stored in association with the matching data in the stored web content messages; and providing the associated data to the chatbot feature for generating the first query.

2. The method of claim 1, further comprising generating the first query via the chatbot feature based on the associated data.

3. The method of claim 2, wherein data derived from the first web element is provided with the associated data to the chatbot feature for generating the first query; and wherein the generating the first query via the chatbot feature based on the associated data comprises generating the first query via the chatbot feature based on the associated data and the data derived from the first web element.

4. The method of claim 2, wherein the first query comprises a most likely query of the customer given the selection of the first visual element as the first point of interest based on the associated data found in association with the first web element that corresponds therewith.

5. The method of claim 2, wherein first web element comprises text.

6. The method of claim 2, wherein the first web element comprises an image.

7. The method of claim 2, wherein the matching data comprises data stored in the stored web content messages that is found to match the first web element.

8. The method of claim 7, wherein the associated data is determined to be stored in association with the matching data via a predetermined criterion.

9. The method of claim 8, wherein the predetermined criterion comprises a criterion defining the associated data as comprising meta data associated with the matching data.

10. The method of claim 8, wherein the predetermined criterion comprises a criterion defining the associated data as comprising data associated with other web elements linked to the first web element.

11. The method of claim 8, wherein the first web element comprises text;

wherein the predetermined criterion comprises a criterion defining the associated data as comprising continuation text related to the text of the first web element.

12. The method of claim 7, wherein the query generation process further comprises:

displaying the generated first query in a text display area of the chat feature; and displaying a prompt in the text display area having one or more query affirming replies related to the first query for selecting by the customer to affirm that the first query comprises a query for which the customer wants to receive an answering response.

13. The method of claim 12, wherein the query generation process further comprises:

receiving a second input from the customer in relation to the prompt indicating a selection by the customer of the one or more query affirming replies;

wherein the second input is provided by the customer via use by the customer of pointing tool of the point of interest indicator.

14. The method of claim 2, wherein the chat feature comprises a chatbot icon and the pointing tool of the point of interest locator is visibly generated as a pointing robot hand;

wherein the pointing tool is configured to enable the customer to move the point tool over the first visual element and then select the first visual element by one of: hovering over the first visual element for a minimum amount of time; or clicking on the first visual element.

15. The method of claim 2, wherein the query generation process further comprises:

determining other information describing a characteristic of the customer; and wherein:

the providing the associated data to the chatbot feature for generating the first query comprises providing the associated data and the other information about the customer to the chatbot feature for generating the first query; and the generating the first query via the chatbot feature based on the associated data comprises generating the first query via the chatbot feature based on the associated data and the other information about the customer.

16. The method of claim 15, wherein the characteristic comprises previous browsing activity of the customer.

17. The method of claim 16, wherein the previous browsing activity of the customer comprises browsing activity occurring before the first input and within a common browsing session as the first input.

18. The method of claim 17, wherein the previous browsing activity relates to the generation of a second query in response to the customer indicating a second point of interest on the first webpage.

19. The method of claim 15, wherein the other information comprises a previous purchase made by the customer from a business associated with the first page.

20. A system for generating a query for a customer based on a point of interest identified on a webpage by the customer, the system comprising:

a processor; and a memory storing instructions which, when executed by the processor, cause the processor to perform the steps of:

generating, as part of a webpage being displayed on a user device of a customer, a chatbot feature, the chatbot feature comprising a point of interest indicator that includes a pointing tool for indicating a point of interest on a webpage, the pointing tool having an engageable icon that, once engaged, is operably movable by the customer for selecting a visual element on the webpage as the point of interest;

providing a point of interest backend service communicationally linked via a network to each of the chatbot feature, the web content message queue, and a datastore; and executing a query generation process to generate a first query in response to the customer indicating a first point of interest on a first webpage, the query generation process comprising:

queuing, in the web content message queue, web content messages of web content used to render the first webpage on the user device of the customer;

receiving the web content messages from the web content message queue and storing the web content messages as stored web content messages in the datastore;

receiving a first input from the customer via the point of interest indicator selecting a first visual element on the first webpage as the first point of interest;

determining a first web element associated with the first visual element and transmitting the first web element to the point of interest backend service;

initiating, in response to receiving the first web element at the point of interest backend service, a search of the stored web content messages using the first web element to determine if matching data is contained therewithin;

upon finding the matching data via the search of the stored web content messages, gathering associated data indicative of a context related to the first query, the associated data comprising data determined to be stored in association with the matching data in the stored web content messages; and providing the associated data to the chatbot feature for generating the first query.

* * * * *